United States Patent
Nakada et al.

(10) Patent No.: US 8,008,896 B2
(45) Date of Patent: Aug. 30, 2011

(54) OUTPUT CONTROL APPARATUS OF GENERATOR

(75) Inventors: Yasuhiro Nakada, Saitama (JP); Toshio Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 278 days.

(21) Appl. No.: 12/261,583

(22) Filed: Oct. 30, 2008

(65) Prior Publication Data

US 2009/0108816 A1  Apr. 30, 2009

(30) Foreign Application Priority Data

Oct. 31, 2007  (JP) .................... 2007-284347

(51) Int. Cl.
*H02P 9/10* (2006.01)
*H02P 9/14* (2006.01)

(52) U.S. Cl. ............... 322/75; 322/28; 322/40; 322/59

(58) Field of Classification Search ............ 322/75, 322/76, 69, 80, 28, 40, 59
See application file for complete search history.

(56) References Cited

U.S. PATENT DOCUMENTS

| | | | | |
|---|---|---|---|---|
| 4,093,869 A * | 6/1978 | Hoffmann et al. | ............... | 290/31 |
| 4,115,729 A * | 9/1978 | Young et al. | .................... | 322/86 |
| 5,598,091 A * | 1/1997 | Satake et al. | .................... | 322/62 |
| 5,694,027 A * | 12/1997 | Satake et al. | .................... | 322/63 |
| 5,719,485 A * | 2/1998 | Asada | ............................. | 322/28 |
| 5,747,971 A * | 5/1998 | Rozman et al. | ................. | 322/10 |
| 5,754,030 A * | 5/1998 | Maehara et al. | ................ | 322/19 |
| 6,130,492 A * | 10/2000 | Satake et al. | ................ | 310/68 R |
| 6,271,649 B1 * | 8/2001 | Iwatani | ........................... | 322/29 |
| 6,462,516 B1 | 10/2002 | Watanabe | | |
| 6,707,276 B2 * | 3/2004 | Takahashi et al. | ............. | 322/28 |
| 6,768,278 B2 * | 7/2004 | Xu et al. | ........................ | 318/140 |
| 6,867,569 B2 * | 3/2005 | Taniguchi et al. | ............. | 322/28 |
| 6,906,479 B2 * | 6/2005 | Xu et al. | ........................ | 318/140 |
| 6,967,461 B1 * | 11/2005 | Markunas et al. | ........... | 318/700 |
| 7,106,028 B2 * | 9/2006 | Iwatani | ........................... | 322/28 |
| 7,106,030 B2 * | 9/2006 | Isurin et al. | ..................... | 322/59 |
| 7,170,263 B2 * | 1/2007 | Yamamoto et al. | ............ | 322/59 |
| 7,173,399 B2 * | 2/2007 | Sihler et al. | ..................... | 322/40 |
| 7,224,148 B2 * | 5/2007 | Watanabe et al. | .............. | 322/59 |
| 7,227,271 B2 * | 6/2007 | Anghel et al. | .................. | 290/31 |
| 7,315,149 B2 * | 1/2008 | Kizawa et al. | .................. | 322/28 |
| 7,358,705 B2 * | 4/2008 | Maehara | ......................... | 322/27 |
| 7,423,351 B2 * | 9/2008 | Maehara | ..................... | 290/40 C |
| 7,683,588 B2 * | 3/2010 | Maehara | ......................... | 322/28 |

(Continued)

FOREIGN PATENT DOCUMENTS

JP  5-76277 B2  10/1993

(Continued)

*Primary Examiner* — Pedro J Cuevas
(74) *Attorney, Agent, or Firm* — Westerman, Hattori, Daniels & Adrian, LLP

(57) ABSTRACT

Output waveform of the generator is improved through stabilization of field current by removing flywheel diode used to be required for automatic voltage regulator. Output electric current of excitation winding 3 is rectified by rectifier 8 and is supplied to field winding 5 of rotor 4. Impedance adjustment circuit 12 is provided to circuit where field current flows. Target electric current determination unit 10 determines target electric current (target field current) used to control output voltage of power generation winding 2 to the reference voltage. Impedance adjustment circuit 12 increases or decreases the impedance of field current circuit so that the field current detected by electric current detector 11 converges with target electric current.

4 Claims, 4 Drawing Sheets

U.S. PATENT DOCUMENTS

| | | | |
|---|---|---|---|
| 7,728,561 B2 * | 6/2010 | Okuno | 322/37 |
| 7,816,893 B2 * | 10/2010 | Oshima | 322/28 |
| 2003/0102738 A1 * | 6/2003 | Kusase | 310/75 R |
| 2005/0151515 A1 * | 7/2005 | Isurin et al. | 322/28 |
| 2006/0061336 A1 * | 3/2006 | Anghel et al. | 322/59 |
| 2011/0050184 A1 * | 3/2011 | Said et al. | 322/95 |
| 2011/0068752 A1 * | 3/2011 | Nakada et al. | 322/28 |
| 2011/0089910 A1 * | 4/2011 | Nakada et al. | 322/28 |
| 2011/0101929 A1 * | 5/2011 | Maedako et al. | 322/24 |

FOREIGN PATENT DOCUMENTS

| | | |
|---|---|---|
| JP | 8-140214 A | 5/1996 |
| JP | 8-140400 A | 5/1996 |
| JP | 2000-317978 A | 11/2000 |
| JP | 3132679 B2 | 2/2001 |

* cited by examiner

OUTPUT CONTROL APPARATUS OF GENERATOR

BACKGROUND OF THE INVENTION

1. Field of the Invention

The present invention relates to an output control apparatus of a generator, and particularly to an output control apparatus of a generator suitable for further improvement of output voltage waveform by maintaining an electric current flowing a field winding constant.

2. Description of the Related Art

In a power generation control apparatus of an alternating-current (AC) generator which includes a power generation winding, excitation winding, and field winding, and rectifies electric current generated in the excitation winding and supplies the same to the field winding, automatic voltage regulator is known in the art which maintains a voltage output from the power generation winding to a predetermined voltage by controlling the electric current supplied to the excitation winding.

FIG. 6 is a drawing showing composition of primary components of the AC generator equipped with conventional automatic voltage regulator. In FIG. 6, a generator 100 includes a field winding 102, a power generation winding 103, and an excitation winding 104. A permanent magnet 106 is provided to a rotor 105 around which the field winding 102 is wound. An automatic voltage regulator (AVR) 107 are provided with a rectifier 108, a voltage detection circuit 109, and a transistor 110. Output of the rectifier 108 is connected to the field winding 102 via a brush 111, and a flywheel diode 112 and a capacitor 113 are connected in parallel with the field winding 102. The excitation winding 104 is connected to input side of the rectifier 108. The rotor 105 is driven by a driving source such as engine (not shown).

In FIG. 6, when the rotor 105 is driven by the engine or the like, an electric current is generated to the excitation winding 104 by the permanent magnet 106. This electric current is rectified by the rectifier 108 and is supplied to the field winding 102 in the form of direct-current (DC) excitation current. The voltage detection circuit 109 compares an output voltage of the power generation winding 103 with a predetermined voltage and executes ON/OFF control of the transistor 110 depending on magnitude of the output voltage with regard to the reference voltage. When the transistor 110 is ON, electric current flows through the field winding 102 thereby increasing output of the power generation winding 103, and when the transistor 110 is OFF, electric current does not flow through the field winding 102 and output of the power generation winding 103 is decreased. Output of the generator 100 is maintained constant by ON/OFF control of the transistor. An example of such AC generator equipped with the automatic voltage generator is described in Japanese Patent Application Laid-Open (JP-A) No. 08-140400.

In the above-mentioned generator, by flowing an electric current through the field winding 102, an induced current is generated to the power generation winding 103, then a back electromotive force is induced to the field winding 102 by magnetic field generated by the electric current. Since the electric current flowing through the field winding 102 is increased or decreased by the back electromotive force, output of the power generation winding 103 fluctuates. However, with conventional automatic voltage regulator 107 which is based on the principle that current increase in constant direction is stopped by the transistor 110, electric current flowing through the flywheel diode 112 connected in parallel with the field winding 102 can not be decreased. When field current is PWM controlled based on voltage detection in the voltage detection circuit 109, the flywheel diode 112 is indispensable to absorption of surge voltage generated at energizing stop and smoothing of the field current.

Therefore, with the control apparatus having the flywheel diode 112, it is not easy to maintain the electric current flowing through the field winding 102 constant. When the electric current flowing through the field winding 102 can not be maintained constant, output voltage of the power generation winding 103 has distortions with respect to the sinusoidal wave. Hence, further improvement of the output voltage waveform is desired.

SUMMARY OF THE INVENTION

The present invention has been made in light of the above-mentioned needs and an object of the present invention is to provide an output control apparatus of a generator equipped with an automatic voltage regulator capable of improving output waveform of the AC generator.

A first feature of the present invention is such that, in an output control apparatus of a generator including a power generation winding being wound around stator side and an excitation winding, a field winding being wound around a rotor turned by a driving source, and a rectifier which rectifies electric current generated by the excitation winding and supplies the same to the field winding, which apparatus includes an electric current detection means for detecting a field current flowing the field winding and an impedance adjustment means being disposed in series to the field winding, wherein the impedance adjustment means is composed so as to adjust the impedance of a circuit including the field winding so that a field current detected by the electric current detection means converges with a predetermined target electric current.

A second feature of the present invention is such that, the target electric current is decreased when output voltage of the power generation winding is greater than a reference voltage and is increased when the output voltage is smaller than the reference voltage.

A third feature of the present invention is such that, the impedance adjustment means includes a transistor connected to the circuit including the field winding, and a comparator which outputs a voltage depending on a difference between the field current detected by the electric current detection means and the target electric current, wherein the impedance is adjusted by inputting an output of the comparator to a base of the transistor to increase or decrease an emitter-collector resistance of the transistor.

A fourth feature of the present invention is such that, the impedance adjustment means is provided to the circuit including the field winding and includes a plurality of lines each having different resistance value, and wherein the impedance is adjusted by selecting any of the plurality of lines according to the output voltage of the power generation winding to increase or decrease resistance of the circuit including the field winding.

According to the present invention having the first through fourth features, since field current flowing through the field winding can be detected by the electric current detection means, a variation in the field current due to mutual interaction of the field winding and the power generation winding can be detected directly. Further, the field current being detected can be converged with an appropriate target electric current by impedance adjustment of the circuit including the field winding by the impedance adjustment means. Accordingly, different from conventional technology in which the field current is turned ON/OFF by a switching element, the flywheel diode for surge voltage absorption generated at energizing stop is unnecessary. As a result, influences of the electric current flowing through the flywheel diode are removed, variation in the field current can be reflected accurately to controls, and therefore, the field current can be stabilized and output of the generator winding, i.e., waveform of the generator output, can be improved.

DETAILED DESCRIPTION OF THE PREFERRED EMBODIMENT

Figure 1:
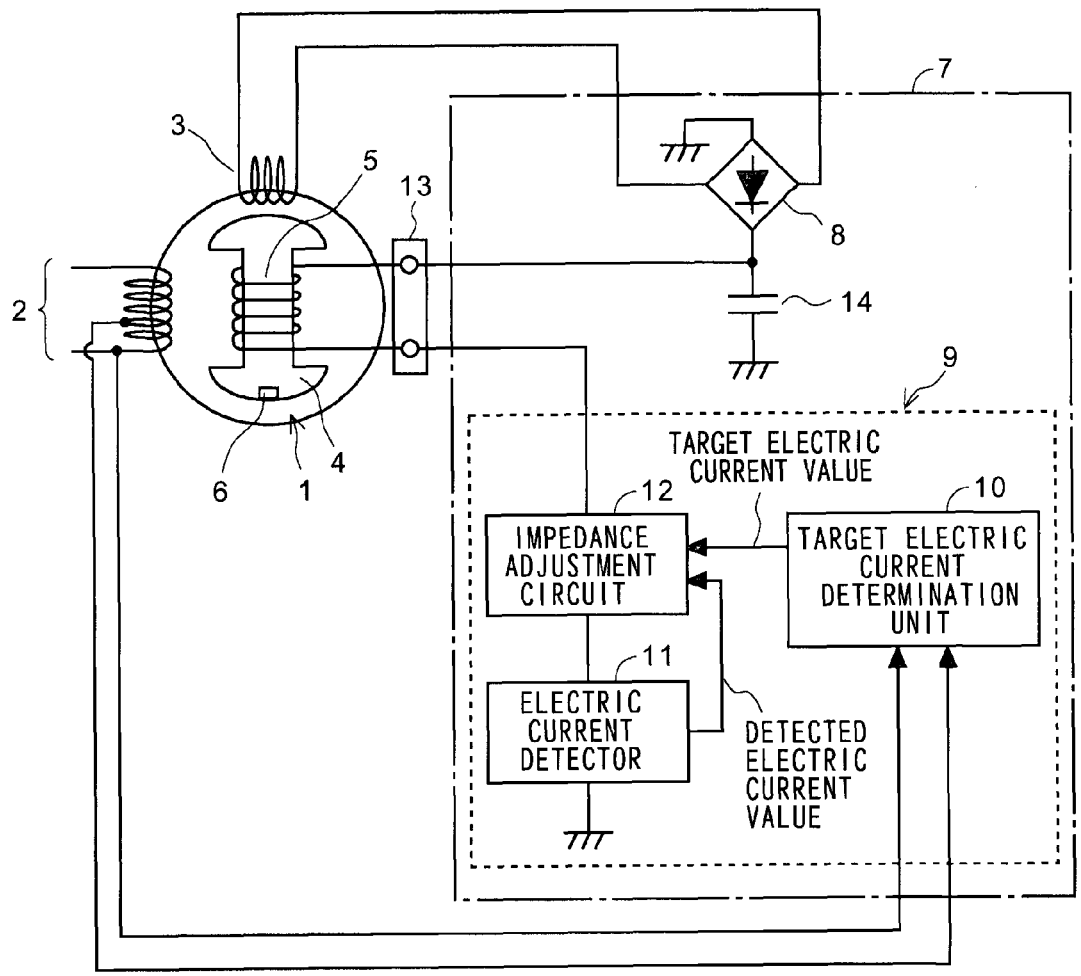
FIG. 1 is a drawing showing composition of primary components of the generator including output control apparatus relating to one embodiment of the present invention.

Referring now to the drawings, the present invention will be explained in detail hereafter. FIG. 1 is a drawing showing composition of primary components of the generator including output control apparatus relating to one embodiment of the present invention. A generator 1 is an AC generator well known to the art and includes a power generation winding 2 and an excitation winding 3 provided at stator side, and a field winding 5 being wound around a rotor 4. A permanent magnet 6 is mounted to the rotor 4 for generation of excitation current on the excitation winding 3. The rotor 4 is driven by a driving source such as engine (not shown).

An automatic voltage regulator 7 includes a rectifier 8 and an electric current control unit 9. Both ends of the excitation winding 3 are connected to input side of the rectifier 8. The electric current control unit 9 includes a target electric current determination unit 10, an electric current detector 11, and an impedance adjustment circuit 12. One end of the field winding 5 is connected to output side of the rectifier 8 and the other end of the field winding 5 is connected to the impedance adjustment circuit 12. The field winding 5 and the automatic voltage regulator 7 are connected via a brush 13. A capacitor 14 for smoothing the output voltage of the rectifier 8 is provided between the rectifier 8 and the ground.

Operations of the automatic voltage regulator 7 shown in FIG. 1 will be explained. When the rotor 4 is turned by such as the engine, an electric current is induced to the excitation winding 3 by magnetic field of the permanent magnet 6. This electric current is rectified by the rectifier 8 and is supplied to the field winding 5 as DC excitation current. A voltage generated in the power generation winding 2, i.e., output voltage of the generator 1, is determined depending on the electric current flowing through the field winding 5. Hence, in the present embodiment, in order to maintain the output voltage of the power generation winding 2 at a predetermined voltage, the electric current flowing through the field winding 5 is designed to be controlled depending on a deviation between output voltage and reference voltage of the power generation winding 2.

The target electric current determination unit 10 compares output voltage value input from the power generation winding 2 (voltage value representative of output voltage value) with the reference voltage and detects a deviation between these two voltages. The target electric current determination unit 10 then outputs a target electric current value being set preliminary depending on the deviation. The target electric current value is input to the impedance adjustment circuit 12.

The electric current detector 11 detects a value of the electric current flowing through the field winding 5 and inputs it into the impedance adjustment circuit 12. The impedance adjustment circuit 12 compares the detected electric current value being input from the electric current detector 11 with the target electric current value being input from the target electric current determination unit 10 and adjusts the impedance of the field winding 5 so that the detected electric current value converges with the target electric current value.

Since all electric currents flowing through the field winding 5 go through the impedance adjustment circuit 12, electric currents flowing through the field winding 5 can be controlled freely by increasing or decreasing the impedance by the impedance adjustment circuit 12. Therefore, the output voltage of the power generation winding 2 can be held constant while electric currents flowing through the field winding 5 are controlled.

Figure 2:
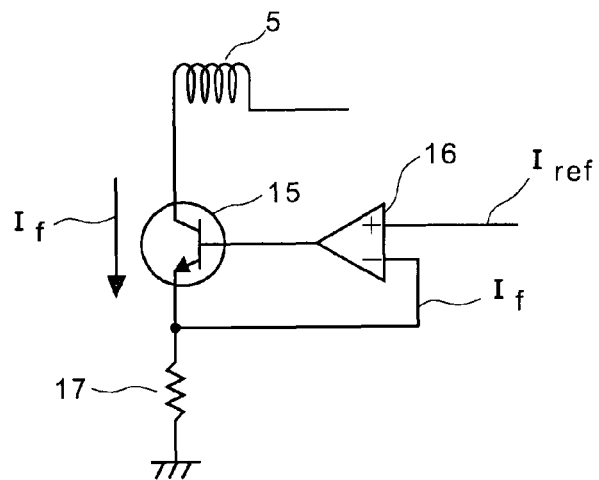
FIG. 2 is a circuit diagram showing specific example of the impedance adjustment circuit.

A specific example of the impedance adjustment circuit 12 is shown in FIG. 2. The impedance adjustment circuit 12 includes a transistor 15 provided in the field current path and a comparator 16 which connects a voltage as the comparison result to the base of the transistor 15. A shunt resistor 17 provided between the transistor 15 and the ground is the electric current detector 11. A voltage value representative of the target electric current Iref being input from the target electric current determination unit 10 is input to positive side input terminal of the comparator 16. A voltage value representative of the field current If being detected by the shunt resistor 17 is input to negative side input terminal of the comparator 16. The comparator 16 inputs a voltage corresponding to deviation of the field current If with regard to the target electric current value Iref to the base of the transistor 15. Electric current flowing across collector and emitter of the transistor 15 is controlled to a value corresponding to the voltage to be applied to the base of the transistor 15. In other words, when the field electric current If detected by the shunt resistor 17 is greater than the target electric current value Iref, the voltage to be applied to the base of the transistor 15 is decreased. In contrast, when the field electric current If is smaller than the target electric current value Iref, the voltage to be applied to the base of the transistor 15 is increased.

A microcomputer may be used in lieu of the comparator 16. For example, a detected electric current is input to the microcomputer, and a voltage value corresponding to the detected electric current is calculated in the microcomputer using a predetermined function. Results of the calculation are converted from digital data to analogue signal, and are input to the base of the transistor 14.

Figure 3:
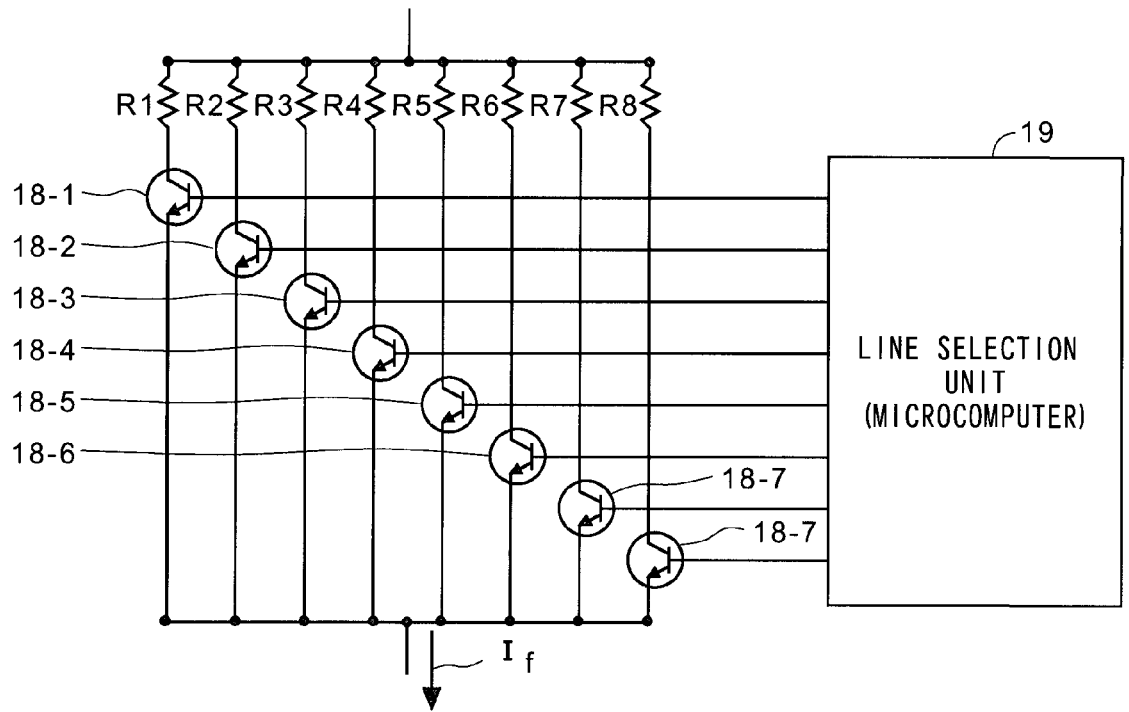
FIG. 3 is a circuit diagram showing modification of the impedance adjustment circuit.

Although impedance is adjusted continuously in the impedance adjustment circuit 12 shown above, stepwise impedance adjustment may be employed. FIG. 3 is a circuit diagram showing modification of the electric current control unit 9 which adjusts the impedance in stepwise fashion. In FIG. 3, the impedance adjustment circuit 12 includes eight parallel lines provided in the field current path, eight resistors R1, R2, ... R8 provided to each of eight lines, and transistors 18-1, 18-2, ... 18-8 connected in series to each of resistances. Each of resistances R1 to R8 has different resistance value. Lines having these resistances and transistors are not limited to eight lines.

A line selection unit 19 is a means for selecting any one of transistors 18-1 to 18-8 and has function for comparison of output voltage of the power generation winding 2 with the reference voltage. The line selection unit 19 calculates a target electric current value based on a deviation of the output voltage of the power generation winding 2 with regard to the reference voltage and outputs a selection signal to, of eight lines, the line set preliminary corresponding to the deviation in order to put the field current closer to the target electric current value. One of transistors 18-1 to 18-8, to which the selection signal is being input to the base thereof is turned ON, and the field current If flows through the resistance to which this transistor is connected. Since each of resistors R1 to R8 has different resistance value, the field current If is changed by the transistor to which the selection signal is input.

Figure 4:
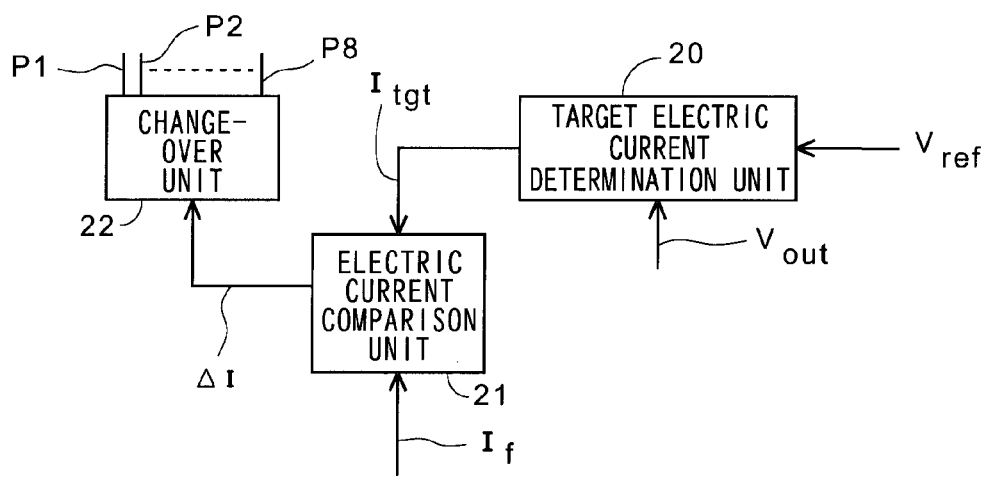
FIG. 4 is a block diagram showing functions of the primary components of a line selection unit of the impedance adjustment circuit.

FIG. 4 is a block diagram showing functions of the primary components of the line selection unit 19. This function can be composed of the microcomputer. Output voltage Vout of the power generation winding 2 is input to a target electric current determination unit 20 and a target electric current value Itgt corresponding to deviation of the output voltage Vout with regard to the reference voltage Vref is determined. An electric current comparison unit 21 calculates a deviation (electric current deviation) ΔI of field current If being detected by a voltage-current detector 11 with regard to the target electric current value Itgt and inputs calculation result to a change-over unit 22. The change-over unit 22 selects port P1 to P8 corresponding to the electric current deviation ΔI being input and outputs a change-over signal. That is, the port selected is activated. Each of the ports P1 to P8 is connected to transistors 18-1 to 18-8 and the transistor connected to the activated port is turned ON.

Figure 5A:
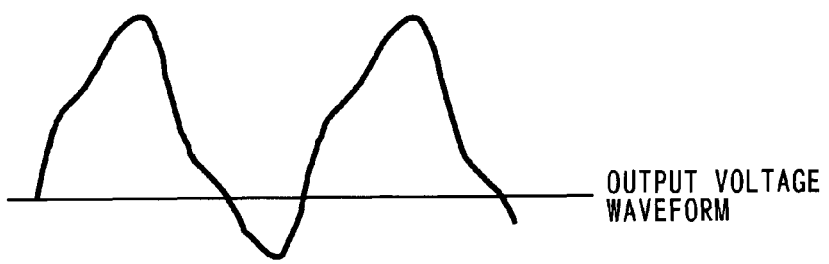
FIG. 5A is a drawing showing of output voltage waveform of the generator controlled by the automatic voltage control apparatus of prior art.
Figure 5B:
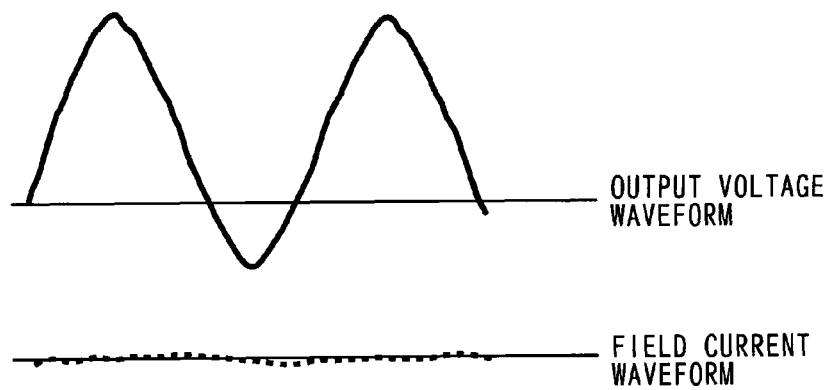
FIG. 5B is a drawing showing results of improvement of output voltage waveform of the generator controlled by the automatic voltage control apparatus of the embodiment as compared to those of prior art.
Figure 6:
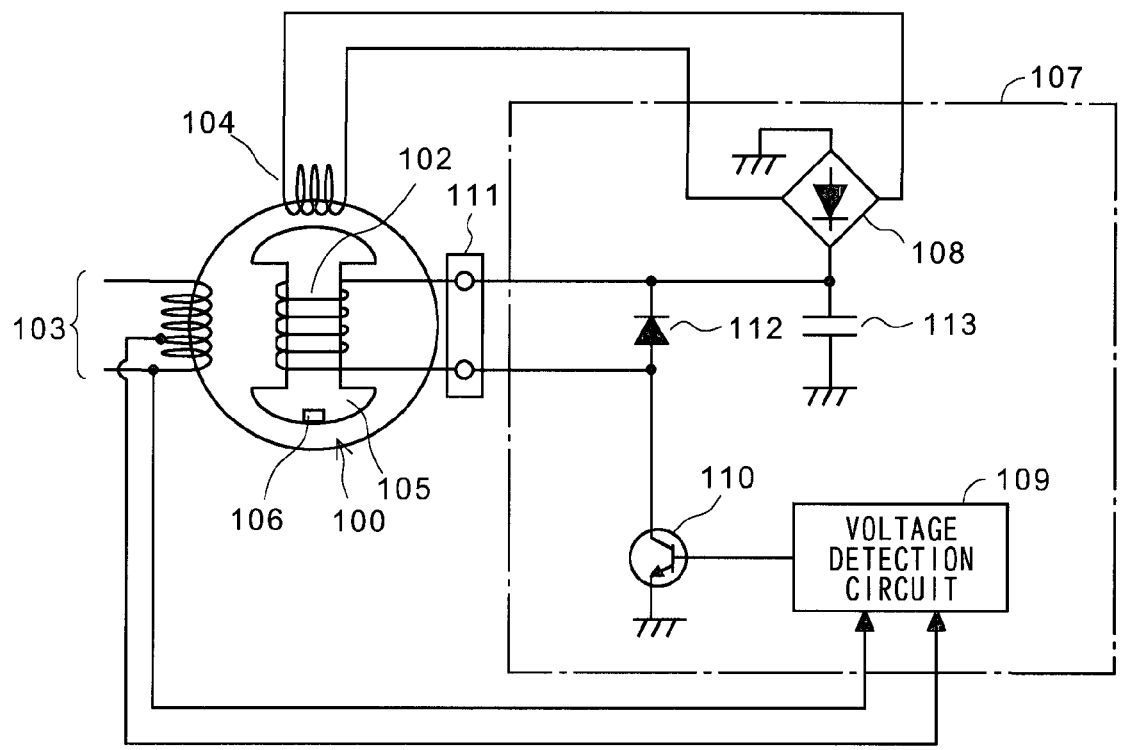
FIG. 6 is a drawing showing composition of primary components of the AC generator having conventional automatic voltage regulator.

FIG. 5A and FIG. 5B show results of improvement of output voltage wave form of the generator 1 by the automatic voltage control apparatus according to the present embodiment as compared to those by conventional technology. FIG. 5A shows output voltage waveform (upper one) of the power generation winding and electric current waveform (lower one) of the field wiring relating to the conventional technology. FIG. 5B shows output voltage waveform (upper one) of the power generation winding 2 and electric current waveform (lower one) of the field winding 5 relating to the present embodiment.

As shown in FIG. 5A, according to the conventional technology, since field current waveform fluctuates significantly, sinusoidal wave of the output voltage waveform of the power generation winding includes distortions. In the meantime, in the generator 1 relating to the present embodiment, as noticed with field current waveform shown in FIG. 5B, impedance of the field current path including the field winding 5 is adjusted by the automatic voltage regulator and the field current is stabilized. Therefore, a clear sinusoidal wave with less distortion is obtained as the output voltage waveform of the generator winding 2.

What is claimed is:

1. An output control apparatus of a generator comprising a power generation winding being wound around a stator side and an excitation winding wound around the stator side, a field winding being wound around a rotor turned by a driving source, and a rectifier which rectifies electric current generated in the excitation winding and supplies the same to the field winding, which apparatus comprises;
    an electric current detection means for detecting a field current flowing the field winding; and
    an impedance adjustment means being disposed in series to the field winding, wherein
    the impedance adjustment means is composed so as to adjust the impedance of a circuit including the field winding so that the field current detected by the electric current detection means converges with a predetermined target electric current.

2. The output control apparatus of the generator according to claim 1, wherein the target electric current is decreased when output voltage of the power generation winding is greater than a reference voltage and is increased when the output voltage is smaller than the reference voltage.

3. The output control apparatus of the generator according to claim 1, wherein the impedance adjustment means includes;
    a transistor connected to the circuit including the field winding; and
    a comparator which outputs a voltage depending on a difference between the field current detected by the electric current detection means and the target electric current, wherein
    the impedance is adjusted by inputting an output of the comparator to a base of the transistor to increase or decrease an emitter-collector resistance of the transistor.

4. The output control apparatus of the generator according to claim 1,
    wherein the impedance adjustment means is provided to the circuit including the field winding and includes a plurality of lines each having different resistance value, and
    wherein the impedance is adjusted by selecting any of the plurality of lines according to the output voltage of the power generation winding to increase or decrease resistance of the circuit including the field winding.

* * * * *